Jan. 6, 1970　　W. K. DECKER ET AL　　3,488,630
FLASHER SIGNAL OR WARNING LAMP FOR USE ON EMERGENCY
VEHICLES AND AIRCRAFT OR THE LIKE
Filed Oct. 11, 1967
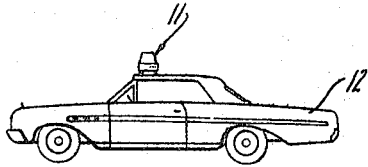
Fig. 1.
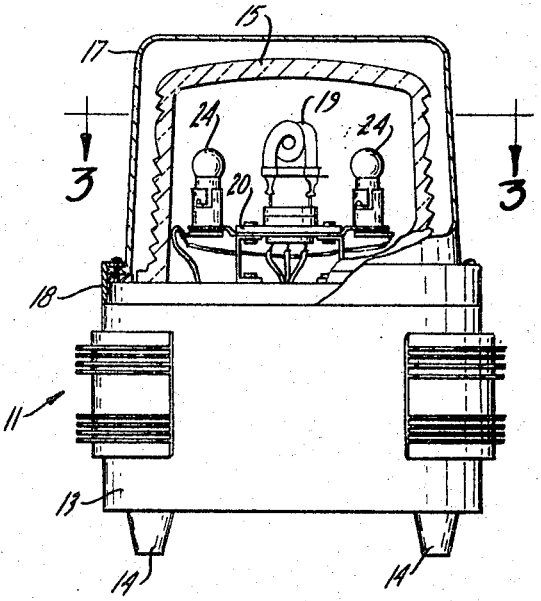
Fig. 2.
Fig. 4.
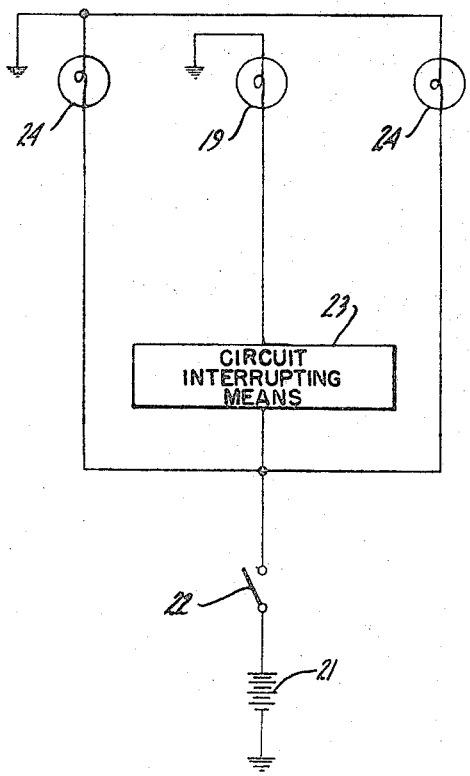
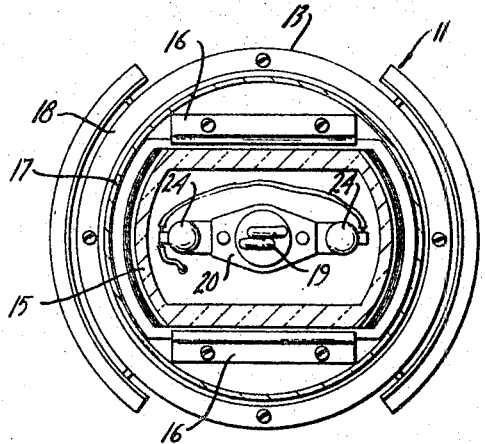
Fig. 3.
INVENTORS
WILTON K. DECKER
WILFRED SCHMIT
BY
Andrus & Starke
Attorneys

United States Patent Office 3,488,630
Patented Jan. 6, 1970

3,488,630
FLASHER SIGNAL OR WARNING LAMP FOR USE ON EMERGENCY VEHICLES AND AIRCRAFT OR THE LIKE
Wilton K. Decker and Wilfred W. Schmit, Port Washington, Wis., assignors to Flo-Tronics, Inc., Minneapolis, Minn., a corporation of Minnesota
Filed Oct. 11, 1967, Ser. No. 674,593
Int. Cl. B60q 1/26, 1/46
U.S. Cl. 340—77                                   4 Claims

ABSTRACT OF THE DISCLOSURE

The flasher signal or warning lamp is provided with a flashing on-off light source. A steady burning light source is associated with the flashing light source and gives reference or orientation to the observers of the flashing light source. And means are provided for energizing and controlling said light sources.

---

This invention relates to flasher signal or warning lamps having application on emergency vehicles such as police, ambulance and work vehicles and/or aircraft and the like.

Flasher signal or warning lamps of the type wherein the flashing light is provided by an oscillating or rotating light source assembly are in common usage. In view of the moving assembly such lamps require periodic attention to assure their proper functioning. It follows that if the flasher light source were fixed, any such attention would be minimal.

With a fixed flasher light source, however, the flashing effect or character results from periodic or cyclic interruption of energy giving rise to an on-off type operation. To an observer, an on-off type flasher light source may give rise to a type of vertigo wherein the light appears to be jumping around and not emanating from a single source. Such loss of reference with respect to the flashing light can be quite dangerous to a motorist at night when he attempts to negotiate around an emergency vehicle having such a fixed on-off type flasher light source. It is generally an object of this invention to obviate this loss of reference characteristic for an on-off type flasher source.

According to this invention a flasher signal or warning lamp assembly is provided with an on-off flashing light source. An auxiliary or secondary steady burning light source is associated with the flashing light source and gives reference or orientation to observers of the flashing light source. The assembly further includes means for energizing and controlling the several light sources.

The drawings furnished herewith illustrate the best mode for carrying out the invention as presently contemplated and set forth hereinafter.

In the drawings:

FIG. 1 is a side elevation of an emergency vehicle having a flasher signal or warning lamp mounted on the roof thereof;

FIG. 2 is a side elevation of the flasher signal or warning lamp of this invention with parts broken away and sectioned;

FIG. 3 is a sectional view taken generally on line 3—3 of FIG. 2; and

FIG. 4 is a diagrammatic view showing a simplified arrangement for controlling the lamp.

Referring to the drawings, the flasher lamp 11 of this invention is shown mounted on the roof of a vehicle 12 and includes a generally cylindrical housing 13 mounted on suitable supports 14. The housing 13 encloses circuitry, not shown, for the lamp 11 and supports a suitable light distributing lens 15 shown secured to the top of the housing by a plurality of brackets 16. A transparent dome member 17, generally colored red, encloses the lens 15 and is held in place by an annular flanged rim member 18 secured to the housing 13.

The flasher signal for the lamp 11 is generated in a light source such as the xenon gas tube bulb 19 fixedly mounted on a suitable support frame 20 within the lens 15. As generally shown in FIG. 4, the lamp 11 is run off of a battery 21, which may be the battery of the vehicle, and is controlled by an on-off master switch 22 generally provided inside the vehicle convenient to the vehicle operator.

The flashing on-off character of bulb 19 is provided by circuit interrupting means 23 in the corresponding electrical circuit shown diagrammatically in FIG. 4. The interrupting means 23 provides for periodic or cyclic interruption of the energized circuit of the light source 19 and is enclosed within the lamp housing 13 and preferably comprises electrical solid state switching means.

To orient or give reference to observers of the flashing on-off light emanating from the lamp 11, a steady burning auxiliary light source is associated therewith and is shown here comprising a pair of spaced incandescent bulbs 24 fixedly mounted on the support frame 20 on opposite sides of the bulb 19. As generally shown in FIG. 4, the incandescent bulbs 24 may be disposed in parallel circuits which in turn parallel the circuit of the flashing light source 19 and the circuit interrupting means 23 therefor. With the bulbs 24 so disposed they will be energized simultaneously with the flashing on-off light source 19 to provide the desired steady burning reference or orientation for the flashing light.

The invention thus provides a flasher signal or warning lamp of the type having an on-off flashing light source wherein reference or orientation for an observer is provided by an auxiliary or secondary steady burning light source associated with the flashing light source.

I claim:

1. In a flasher light or warning lamp assembly for use on emergency vehicles and aircraft or the like, a housing including fixed frame means, a gaseous flasher tube light source supported by the frame means and disposed in an electrical circuit, circuit interrupting means in the circuit of the flasher tube light source to provide for flashing on-off light emanating from said light source when the circuit thereof is energized, a second light source supported by the frame means and disposed in an electrical circuit paralleling the circuit of the flasher tube light source and providing steady burning, uninterrupted light when the circuit thereof is energized to give reference to the light emanating from the flasher tube light source, means for energizing the parallel circuits for said light sources simultaneously, said light sources being arranged in a given vertical plane, and a stationary lens carried by the housing and enclosing said light sources and having opposed sides generally paralleling the plane of the light sources.

2. The invention as set forth in claim 1 wherein a transparent dome member is carried by the housing in spaced relation from the lens.

3. The invention as set forth in claim 1 wherein the flasher tube light source comprises a xenon flasher tube and the second light source comprises at least one incandescent lamp.

4. The invention as set forth in claim 1 wherein the second light source comprises a pair of incandescent lamps respectively disposed on opposite sides of the flasher tube light source.

References Cited

UNITED STATES PATENTS

| | | | |
|---|---|---|---|
| 2,201,657 | 5/1940 | Westlund. | |
| 2,794,967 | 6/1957 | Coggins et al. | 340—331 X |
| 2,809,366 | 10/1957 | Van Boort et al. | 340—105 X |
| 2,850,716 | 9/1958 | Smale | 340—50 X |
| 2,880,405 | 3/1959 | Lerman | 340—81 |
| 2,956,273 | 10/1960 | Fruengel | 340—331 |
| 2,968,025 | 1/1961 | Owens | 340—87 X |
| 3,024,386 | 3/1962 | Chauvineau | 340—105 X |
| 3,273,118 | 9/1966 | Hendershot | 340—89 |
| 3,390,304 | 6/1968 | Scott et al. | 340—83 X |

FOREIGN PATENTS 208,118   9/1955   Australia.

JOHN W. CALDWELL, Primary Examiner

K. N. LEIMER, Assistant Examiner

U.S. Cl. X.R.

340—81